Sept. 5, 1939.  E. M. NORMAN  2,172,031
STRAINER
Filed Jan. 11, 1938
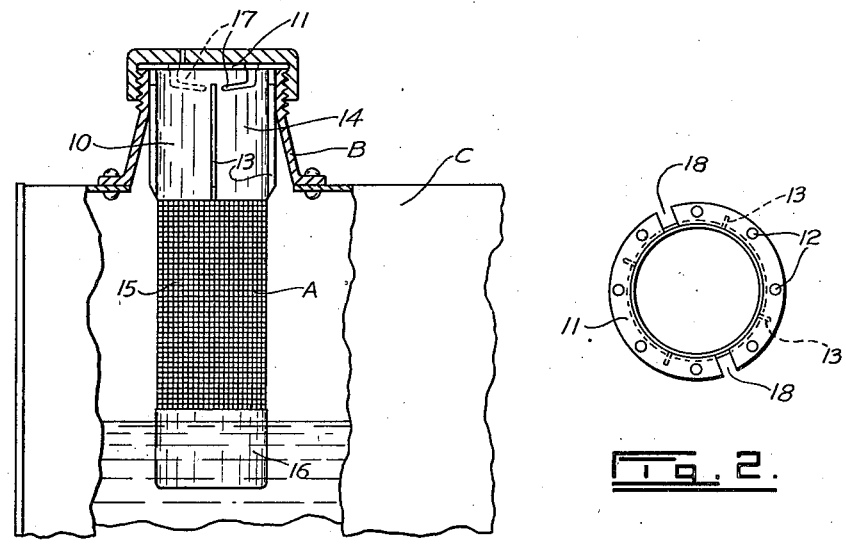
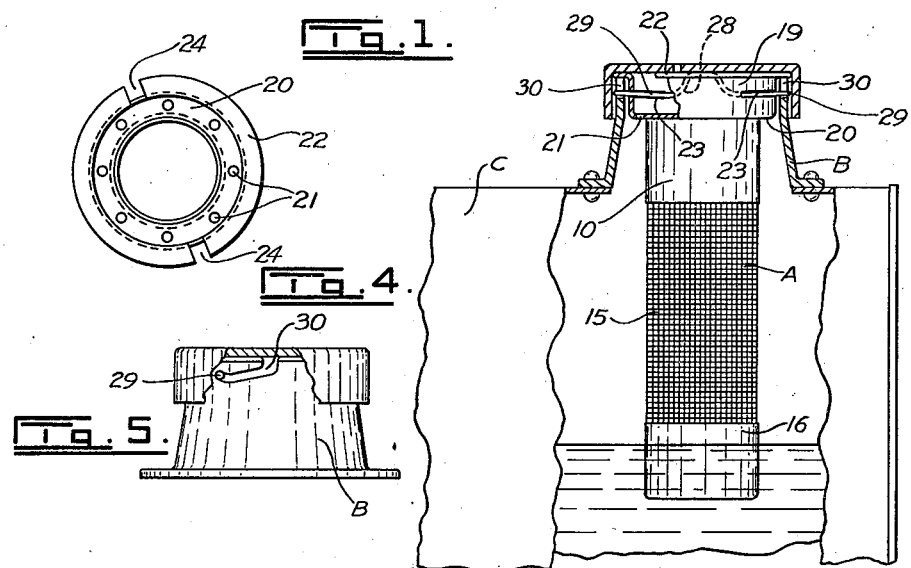
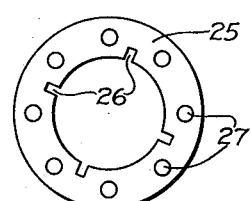
INVENTOR
Edgar Morris Norman.
BY Eugene E. Stevens
ATTORNEY Patented Sept. 5, 1939

2,172,031

UNITED STATES PATENT OFFICE 2,172,031

STRAINER

Edgar Morris Norman, Burnaby, British Columbia, Canada

Application January 11, 1938, Serial No. 184,461
In Canada January 16, 1937

3 Claims. (Cl. 210—154)

This invention relates to a strainer for liquids particularly adapted for use in gasoline tanks.

An object of the present invention is the provision of a strainer adapted to remove foreign particles from liquids and to retain said particles.

Another object is the provision of a strainer which will fit in tanks having necks of various sizes.

A further object is the provision of a strainer for a tank having means for allowing air to escape as the liquid is poured through the strainer into the tank.

A further object is the provision of a strainer adapted to fit in the necks of tanks, and to be held in place by any of the known types of caps.

A still further object is the provision of a device of the character described of very simple construction which may be easily manufactured.

There are a number of strainers now on the market but each of those are made to fit into a tank having a neck of a certain size. Another objection to the known strainers is that the foreign particles removed from the liquid gather on the screen and after a short time gradually work their way through the screen into the tank thus reducing the effectiveness of the strainer which retains only the coarser particles. A further objection to these strainers lies in the fact that as the liquid is pored into the tank the air which must necessarily leave the tank passes through the strainer causing the liquid to splash over the top of the tank unless the liquid is poured very slowly.

This invention overcomes these difficulties by providing a strainer which may be inserted in various tanks having necks of different sizes, which has means for removing particles from the liquid and retaining said particles no matter how fine they are, and which has means for allowing air to escape from the tank while the liquid is being poured.

The present invention consists essentially of a strainer comprising a sleeve, means for holding said sleeve in the neck of a tank, means for spacing the sleeve from the wall of the neck, a tubular screen suspended from the sleeve and a cup secured to the bottom of the screen as more fully described in the following specification and illustrated in the accompanying drawing in which Figure 1 is an elevation of one form of the strainer mounted in the neck of a tank, the latter being partly in section, Figure 2 is a plan view of the strainer shown in Figure 1, Figure 3 is an elevation of an alternative form of strainer mounted in the neck of a tank, the latter being partly in section, Figure 4 is a plan view of the strainer shown in Figure 3, Figure 5 is a fragmentary elevation of the tank neck illustrated in Figure 3 showing one of the bayonet slots, and Figure 6 is a plan view of an adapter washer.

Referring more particularly to the drawing, A is a strainer adapted to be inserted in the neck B of a tank C. Referring to the form of the invention shown in Figure 1, the strainer A comprises a sleeve 10 having at its upper end a flange 11 having a plurality of openings 12. The sleeve 10 is provided on its outer surface with a plurality of vertical spacer ribs 13 the upper ends of which terminate adjacent the flange 11. These ribs, form therebetween passages 14 communicating with the openings 12 and the interior of the tank.

A tubular filter element or screen 15 is suspended from the sleeve 10 and has secured to its bottom edge a sediment cup 16. A pair of diametrically opposed bayonet slots 17 are provided at the upper end of the sleeve 10 the purpose of which will hereinafter be described. The vertical slots of the bayonet slots 17 communicate with slots 18 in the flange 11.

Referring to the form of the invention shown in Figure 3, the sleeve 10 is provided with an enlarged collar 19 in place of the ribs 13, said collar being secured to the sleeve by a flange or web 20 having therein a plurality of openings 21. The upper end of the collar 19 is provided with a flange 22, said collar also having at its upper end a pair of diametrically opposed bayonet slots 23 the vertical slots of which communicate with slots 24 in the flange 22.

When it is desired to insert the strainer A (Figure 1) in the neck of a tank which is too large for the flange 11, an adapter ring 25 may be used. The inside diameter of the ring 25 would be substantially equal to the diameter of the sleeve 10 and the outside diameter of said ring would equal the outside diameter of the neck of the tank. The ring 25 has cut in its inner edge a plurality of recesses 26, one for each rib 13. Said ring also has a plurality of openings 27 adapted to register with the openings 12 when the strainer is inserted in the ring. The strainer would be inserted in the ring 25 with the ribs 13 riding through the recesses 26 until the ring contacts the flange 11 at which time the ribs would be clear of the recesses. A quarter turn of the ring would ensure said ring staying in place and at the same time would bring the openings 27 into registry with the openings 12. With this assembly the ring 25 would rest on the top of the tank neck when the strainer is inserted therein. In the form of the invention shown in Figure 3, the adapter ring would fit around the collar 19 beneath the flange 22. An ordinary washer of the proper diameter or the ring 25 may be used although the recesses 26 and the openings 27 of the latter are not necessary in this form of the invention.

This strainer is designed to be held in place by the cap of the tank and may be used with any of the known types of cap. Figure 1 shows a cap adapted to be screwed onto the neck while Figure 3 shows a cap of the type having a clip 28 with arms 29 the ends of which ride in bayonet slots 30 in the neck. The strainer A on being inserted in the neck, when the cap is placed over the neck the arms 29 ride down the vertical slots of the bayonet slots 17 or 23 and then when the cap is turned the arms move into the horizontal portions of said slots. When these caps are in place they fit tightly over the flanges 11 or 22 and hold the strainer in place. The ribs 13 or the collar 19 serve to steady the strainer in the neck.

In use, when liquid is poured into the tank through the strainer, the cup 16 first fills up and then the liquid passes out laterally through the screen 15. In this way any foreign particles are deposited in the cup where they are retained until the cup is cleared out. In certain types of strainers having screening in place of the cup 16, the foreign particles rest on the screening and the continual pouring of liquid against them gradually forces the particles through the screening thus reducing the efficiency of the strainer. As the liquid is poured into the tank, the air escapes therefrom through the passages 14 between the ribs 13 (Fig. 1) and through the openings 12 without interfering with the liquid, or, as in Figure 3, the air escapes through the openings 21.

From the above it will readily be seen that a strainer has been provided which will fit into the necks of tanks of various types of caps and which will remove substantially all foreign particles from the liquid without interfering with the pouring operation.

Various modifications may be made in this invention without departing from the spirit thereof or the scope of the claims, and therefore the exact forms shown are to be taken as illustrative only and not in a limiting sense, and it is desired that only such limitations shall be placed thereon as are disclosed in the prior art or are set forth in the accompanying claims.

What I claim as my invention is:

1. A strainer adapted to fit into the neck of a tank comprising a sleeve having bayonet slots therein at the top thereof, a filter element suspended from the sleeve, a cup secured to the bottom of the filter element, a flange at the top of the sleeve having a plurality of openings therein to permit air to escape from the tank as liquid is poured thereinto, said flange having slots communicating with the bayonet slots of the sleeve, and means for spacing the sleeve from the neck.

2. A strainer adapted to fit into the neck of a tank comprising a sleeve, a tubular filter element suspended from the sleeve, a cup secured to the bottom of the filter element, a flange at the top of the sleeve adapted to lie over the top of the neck of the tank beneath the cap thereof to hold the filter in place, said flange having a plurality of openings therein to permit air to escape from the tank as liquid is poured thereinto and a plurality of vertical ribs on the outer surface of the sleeve forming therebetween passages communicating with said openings and the interior of the tank, the upper ends of said ribs being spaced from the flange.

3. A strainer adapted to fit into the neck of a tank comprising a sleeve, a tubular filter element suspended from the sleeve, a cup secured to the bottom of the filter element, an enlarged collar secured to the top of the sleeve by a web, said web having a plurality of openings therein to permit air to escape from the tank as liquid is poured thereinto, bayonet slots formed in the collar at the top thereof, and a flange at the top of the collar adapted to lie over the top of the neck of the tank and to be held in place by the tank cap, said flange having slots formed therein communicating with the bayonet slots.

EDGAR MORRIS NORMAN.